(12) United States Patent
Bender et al.

(10) Patent No.: US 7,931,100 B2
(45) Date of Patent: Apr. 26, 2011

(54) AUXILIARY DRIVE FOR A TRAILER

(75) Inventors: Helmuth Bender, Eschenburg (DE);
Steffen Bender, Eschenburg (DE);
Michael Petrus van Schie, Delft (NL)

(73) Assignee: Reich KG, Eschenburg-Wissenbach (DE)

( * ) Notice: Subject to any disclaimer, the term of this patent is extended or adjusted under 35 U.S.C. 154(b) by 564 days.

(21) Appl. No.: 11/727,756

(22) Filed: Mar. 28, 2007

(65) Prior Publication Data

US 2007/0228811 A1 Oct. 4, 2007

(30) Foreign Application Priority Data

Mar. 28, 2006 (NL) ..................................... 1031455

(51) Int. Cl.
*B62D 59/04* (2006.01)
(52) U.S. Cl. ..... 180/14.2; 180/10; 180/65.51; 180/65.6; 301/137
(58) Field of Classification Search ................. 180/14.2, 180/10, 65.51, 65.6; 301/137
See application file for complete search history.

(56) References Cited

U.S. PATENT DOCUMENTS

| | | | | |
|---|---|---|---|---|
| 656,389 A * | 8/1900 | Collins | ........................ | 180/6.28 |
| 1,593,194 A * | 7/1926 | Scott | ............................... | 318/58 |
| 1,668,210 A * | 5/1928 | Kincaid | ........................... | 180/10 |
| 1,743,751 A * | 1/1930 | Baker | .............................. | 310/83 |
| 2,759,572 A * | 8/1956 | Lyon | .......................... | 188/264 R |
| 2,973,843 A * | 3/1961 | Lyon | .......................... | 188/264 R |
| 3,094,186 A * | 6/1963 | Lappin et al. | ................ | 180/19.1 |
| 3,186,506 A * | 6/1965 | Leach et al. | .................... | 180/10 |
| 4,676,330 A * | 6/1987 | Roberts | ........................ | 180/14.2 |
| 6,651,786 B2 * | 11/2003 | Fujii et al. | ................. | 188/264 B |
| 6,698,557 B2 * | 3/2004 | Hayes et al. | ........... | 188/264 AA |
| 7,083,015 B2 * | 8/2006 | Ruppert et al. | .............. | 180/65.1 |
| 7,445,067 B2 * | 11/2008 | Marsh et al. | ............... | 180/65.51 |

FOREIGN PATENT DOCUMENTS

| | | |
|---|---|---|
| DE | 850 391 C | 9/1952 |
| DE | 196 14 752 | 10/1997 |
| EP | 1 394 024 | 3/2004 |
| FR | 1 021 254 | 2/1953 |

* cited by examiner

*Primary Examiner* — Joanne Silbermann
*Assistant Examiner* — Marlon A Arce
(74) *Attorney, Agent, or Firm* — Young & Thompson

(57) ABSTRACT

Auxiliary drive for a trailer such as a caravan. Said drive consists of a drive unit with a gearwheel. Through linear movement of the drive unit relative to the chassis, said gearwheel can be brought into engagement with a ring gear fitted either on the brake drum of a wheel of the vehicle or on an auxiliary part such as a covering drum fitted over said brake drum. The ring gear preferably lies in a plane outside the plane bounded by the inside of the wheel.

17 Claims, 5 Drawing Sheets

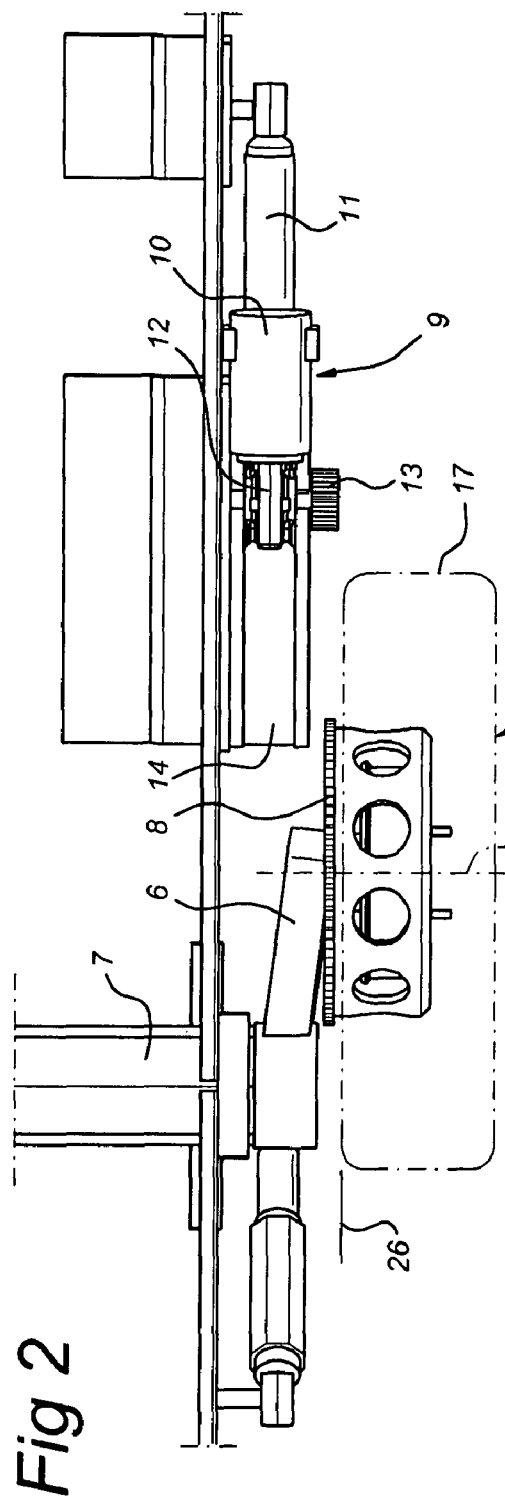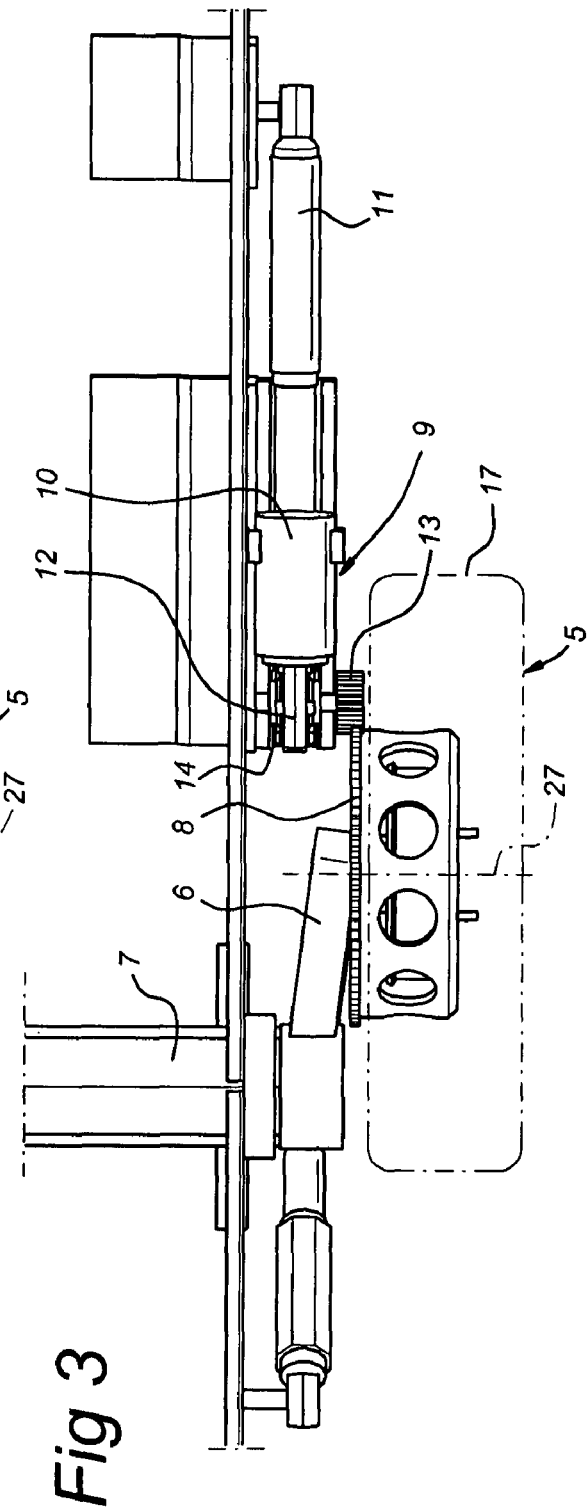

AUXILIARY DRIVE FOR A TRAILER

BACKGROUND OF THE INVENTION

The present invention relates to an auxiliary drive for a trailer. Such an auxiliary drive, for example for a caravan, is generally known in the prior art. It has long been a recognized problem that after uncoupling from a towing vehicle, manoeuvring of heavier trailers in particular constitutes a problem, which can be solved by using relatively small electric motors, which drive the wheels of the trailer. In the prior art the use of drive rollers that are connected to the electric motors and engage the tyre of the wheel is generally proposed.

The problem is, however, that considerable pressure forces are necessary to prevent slipping between the drive rollers and the wheels. The fact is that driving of the wheels is required most in difficult circumstances in which such wheels are on soggy ground or the like, when the grip between wheel and drive roller will also be far from optimum.

It is felt by some that the pressure of the roller against the tyre can cause damage to the tyre in the long run. Moreover, such a drive is easily damaged. For that reason, British Patent Specification 2,305,408 proposes a drive in which the brake drum of the wheel is provided with a ring gear, and an auxiliary shaft extending parallel to the wheel axle is present. The auxiliary shaft is provided with a gearwheel on both sides, which gearwheel engages with the abovementioned ring gear, on the one hand, and with an auxiliary drive lying inside the chassis, on the other hand. By movement in the axial direction, engagement or disengagement can be achieved.

Such a structure avoids the problem of failing contact between roller and tyre, but it has the disadvantage that such a system is not easily universally usable. Moreover, the position of the spring-loaded wheel relative to the chassis constitutes a problem for the positioning of the auxiliary drive.

SUMMARY OF THE INVENTION

It is one object of the present invention to avoid this disadvantage. This object is achieved according to a first aspect of the invention with an auxiliary part for an auxiliary drive for a trailer such as a caravan, comprising a drum part, which on one free end is provided with a ring gear fitted on its outer circumference, and on the other free end is provided with a bottom having at least three bolt holes lying equally spaced on a pitch circle, said drum being provided with cooling air apertures between the two free ends. This auxiliary part can in particular be combined with an auxiliary drive. The auxiliary part in fact forms a sort of covering drum which leaves the existing brake system intact and is placed in between the existing drum and the wheel. It is held in place by the bolts/nuts used for fixing the wheel on the existing brake drum. Such a covering drum can be used in a simple manner as a universal part, since the clear space between the external diameter of the existing brake drum and the interior of the wheel rim is more or less the same in most wheels, the only variable being the number of bolt holes, the pitch circle of the bolt holes and the central aperture in the drum. These can be provided in a simple manner.

According to a further aspect of the present invention, a trailer is provided, comprising a chassis, an axle and an auxiliary drive, said axle being provided with a drum having circumferential gear teeth and a wheel provided on said drum, said gear teeth extending beyond the outer surface of the tyre of said wheel, and also comprising a drive unit provided with a gearwheel, said drive unit being displaceable for engaging with said gear teeth of said drum. According to this aspect, the gear teeth on the drum are taken so far outwards that the auxiliary drive can be moved substantially laterally, in other words in a direction perpendicular to the direction of the axis of the wheel, and in this way can be brought into engagement with the ring gear. The ring gear can be provided either on a brake drum or on the auxiliary part described above, which is used as a covering drum. Such a construction dispenses with an auxiliary shaft of the type described in GB 2,305,408 and simple engagement with the wheel can be provided. Furthermore, guaranteed engagement can be achieved in all circumstances.

The drive unit is preferably movable linearly by means of an actuator. The actuator is preferably controlled by the same motor as that driving the gearwheel.

The invention will be explained in greater detail below with reference to exemplary embodiments shown in the drawing, in which:

DRAWINGS

FIG. 2 shows in top view a detail of the wheel construction of the trailer shown in FIG. 1, in a first position of the drive unit;

FIG. 3 shows a view corresponding to that of FIG. 2 in which the drive unit is in the working position;

DETAILED DESCRIPTION

Figure 1:
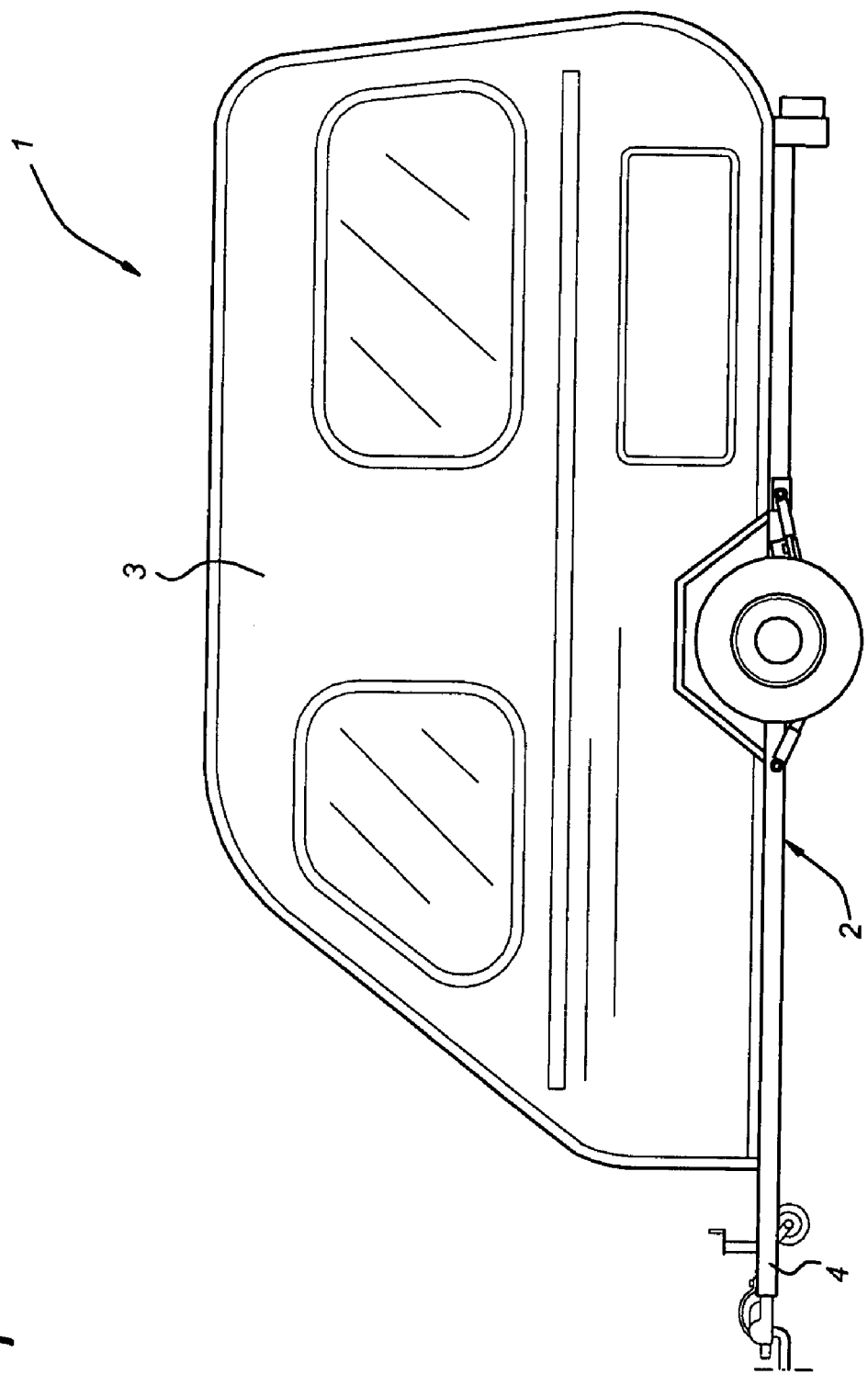
FIG. 1 shows diagrammatically a trailer in which the device according to the present invention is used.
Figures 4, 5:
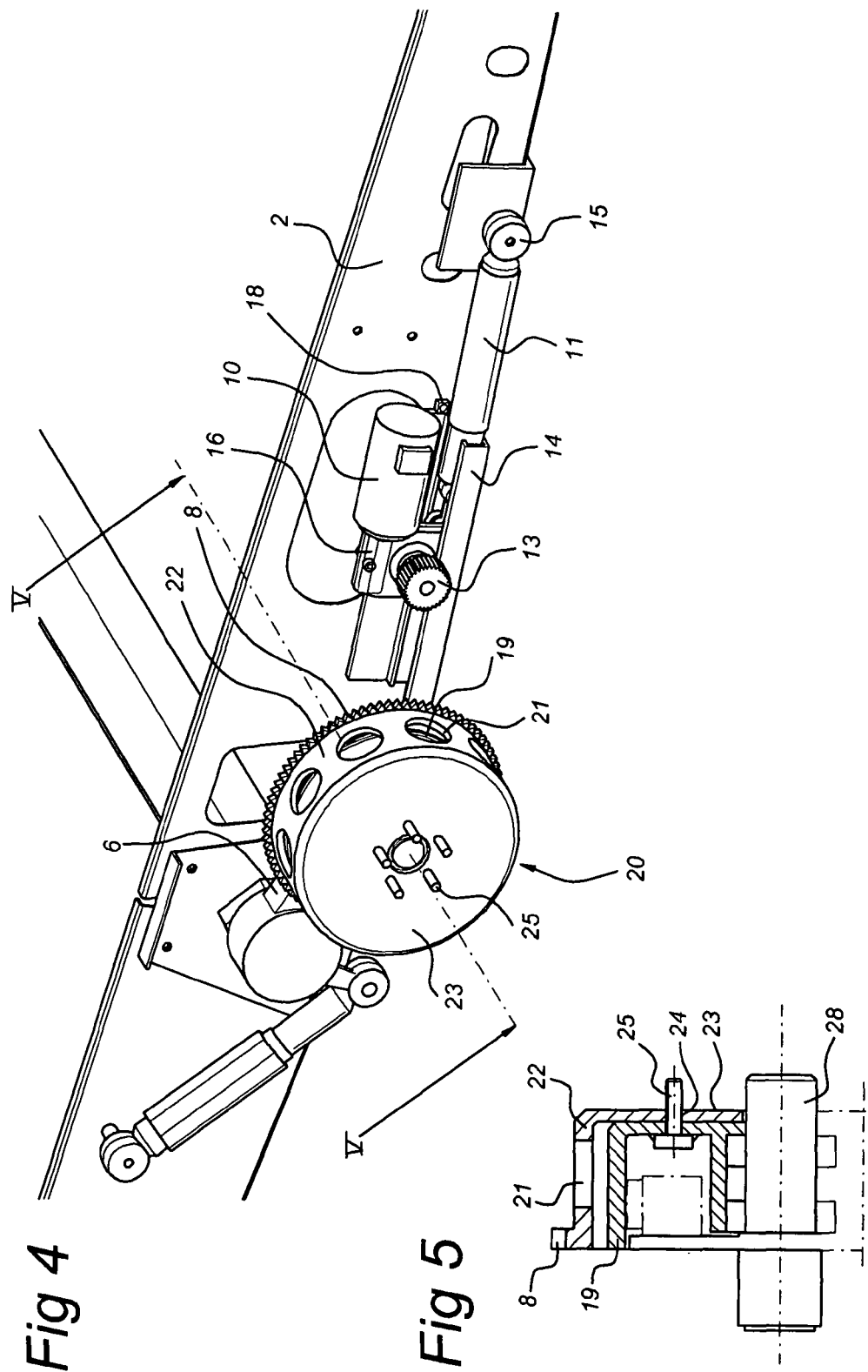
FIG. 4 shows in perspective the construction shown in FIGS. 2 and 3.
FIG. 5 shows a cross section along the line V-V in FIG. 4.

In FIG. 1 a caravan is indicated by 1. This caravan comprises a chassis 2 with a superstructure 3 and a tow bar 4. It should be understood that the present invention can be used for any trailer which in "normal" circumstances is moved by a towing vehicle and in the case of which its own drive is needed only after uncoupling from the towing vehicle. As can be seen from FIG. 2 and on, the caravan is provided with an axle 7 having a suspension arm 6 hinged to the axle. Wheel 5 is connected to suspension arm 6 and is provided with a tyre 17. It is clear from FIG. 5 that a shaft stud 28, around which a conventional brake drum 19 is rotatably fitted, is provided on suspension arm 6. Details of the brake construction present in the brake drum 19 are not shown. Bolts 25, onto which wheel nuts can be screwed in order to fix the wheel 5, extend from the brake drum 19.

According to an aspect of the present invention, an auxiliary part or covering drum 20 is fitted over drum 19. The internal diameter of said covering drum is greater than the external diameter of brake drum 19, while the external diameter of the drum part 22 of the auxiliary part 20 is smaller than the space bounded inside the wheel rim 5. Cooling air apertures 21 are present. The drum part 22 is provided with a ring gear 8 on one end, and is provided with a bottom 23 on the other end, which bottom is provided with bolt holes 24. The pitch and position of the bolt holes correspond to the pitch and position of the bolts 25 in the drum 19, so that covering drum 20 can be slid over drum 19 without any problems.

As can be seen from FIGS. 2 and 3, the construction here is such that the ring gear 8 lies outside the plane bounded by the tyre 17 (or wheel 5). This outer boundary is indicated by line 26 in FIG. 2. A drive unit 9 is present, which drive unit is fixed on the chassis 2. On the one hand, the drive unit is fixed at fixing point 15, to which an actuator 11 is connected, which actuator, on the other hand, acts upon a motor 10 which is connected to a transmission 12 and gearwheel 13. This gearwheel 13 can be a conventional gearwheel. The unit, consisting of motor 10, transmission 12 and a gearwheel 13, is fitted on a slide 16 which moves in a guide 14, which is rigidly fixed on the chassis 2. The unit 9 can be fixed on the existing chassis, for example by means of bolts in pre-drilled holes or in newly drilled holes in the chassis. It is also possible to fit a clamp structure around the chassis part concerned, which would obviate the need for drilling holes in the chassis. In addition, it is possible if two units 9 are used on the left and right side of, for example, a caravan, to fit a connecting bar between the two in order to spread the forces as much as possible over the chassis. If this is a universal structure, this connecting bar is preferably adjustable in length (width). According to the present invention, the gearwheel 13 is situated outside the chassis, i.e. in the space between the outer boundary of the chassis and the inner boundary of the wheel/tyre 5/17. This means that the problem that the drive unit has to be placed between cross beams and the like does not arise, and said drive unit can be fitted and maintained, if necessary, in a simple manner. A control system 18, which responds to signals generated by means of a remote control or other control, is present. As will be clear from a comparison of FIGS. 2 and 3, in the travelling position, i.e. the position in which the trailer is being towed, the actuator moves the gearwheel 13 out of engagement with ring gear 8. After the towed vehicle has been uncoupled from the towing vehicle, gearwheel 13 is pressed into engagement with ring gear 8 by moving actuator 11. The presence of gear teeth means that the pressure force is limited or even irrelevant. Only the mutual position of ring gear 8 and gearwheel 13 is important for ensuring complete engagement. The desired movement can be achieved by subsequently driving gearwheel 13. It will be understood that each side of the trailer is provided with such a construction and that possibilities exist for driving the gearwheel 13 concerned at a different speed and/or in a different direction in order to make manoeuvring possible. Furthermore, safety devices may be present to ensure that it is not possible to tow the caravan so long as gearwheel 13 is in engagement with ring gear 8. On the other hand, such a gearwheel engagement can serve as a block to prevent the trailer from being driven away, so that theft is prevented. Furthermore, measures can be taken to prevent said gearwheel 13 from turning before actuator 11 has brought gearwheel 13 into engagement with the ring gear 8.

Instead of the covering drum or auxiliary part 20 shown here, it is also possible to provide a drum that functions as a brake drum at the same time and is provided with the ring gear on one end. It is essential here for such a ring gear to be situated outside the plane of the wheel, in other words to be positioned in such a way that putting into or taking out of engagement can be achieved by a simple movement to and fro of the motor 10 with transmission 12 and gearwheel 13. It will be understood that the movement of the gearwheel 13 does not have to be absolutely parallel to a line perpendicular to axis 27, but that can said gearwheel can be placed at a slight angle.

Figure 6:
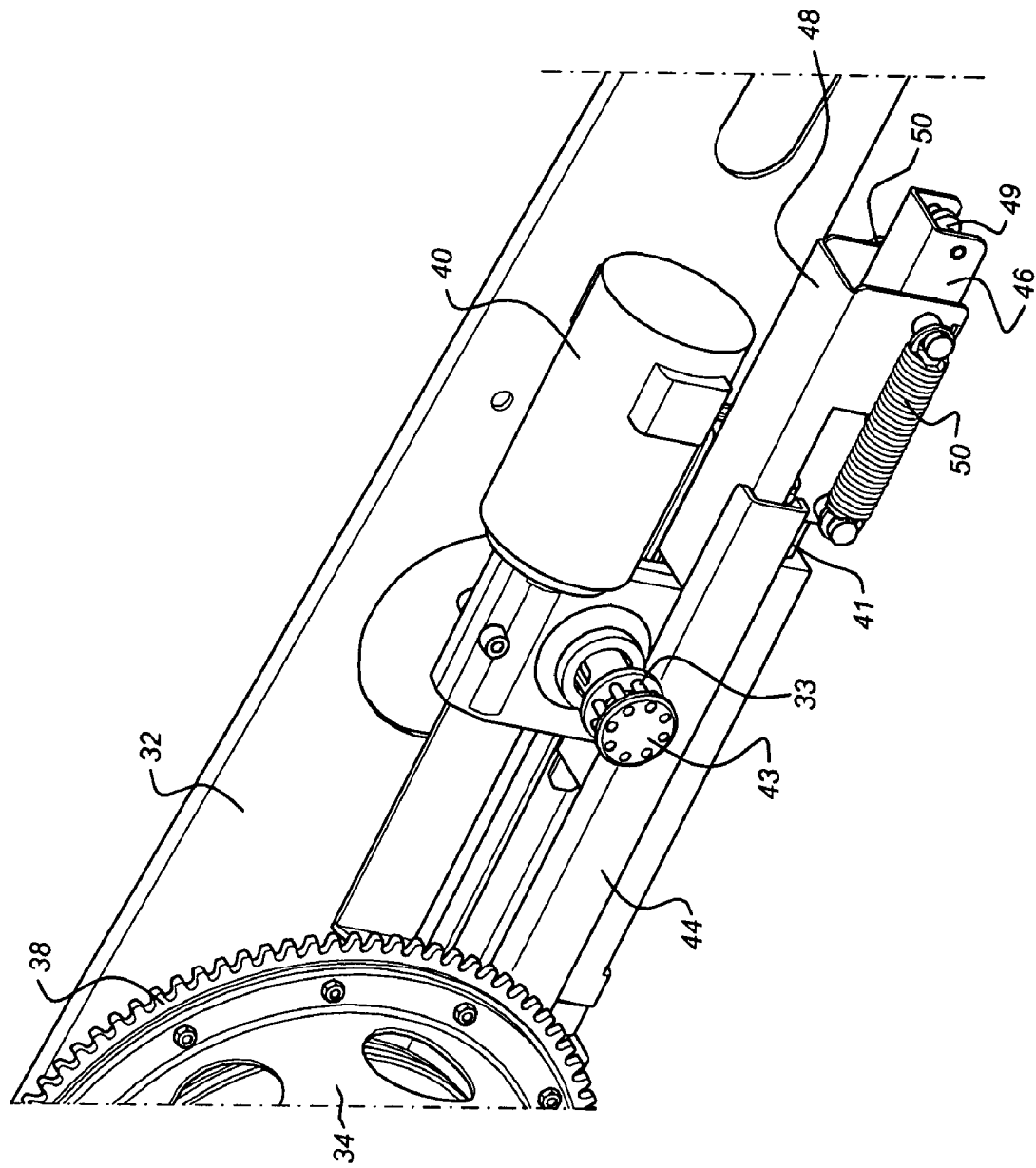
FIG. 6 shows in perspective view a further embodiment of the invention in first non-active position.
Figure 7:
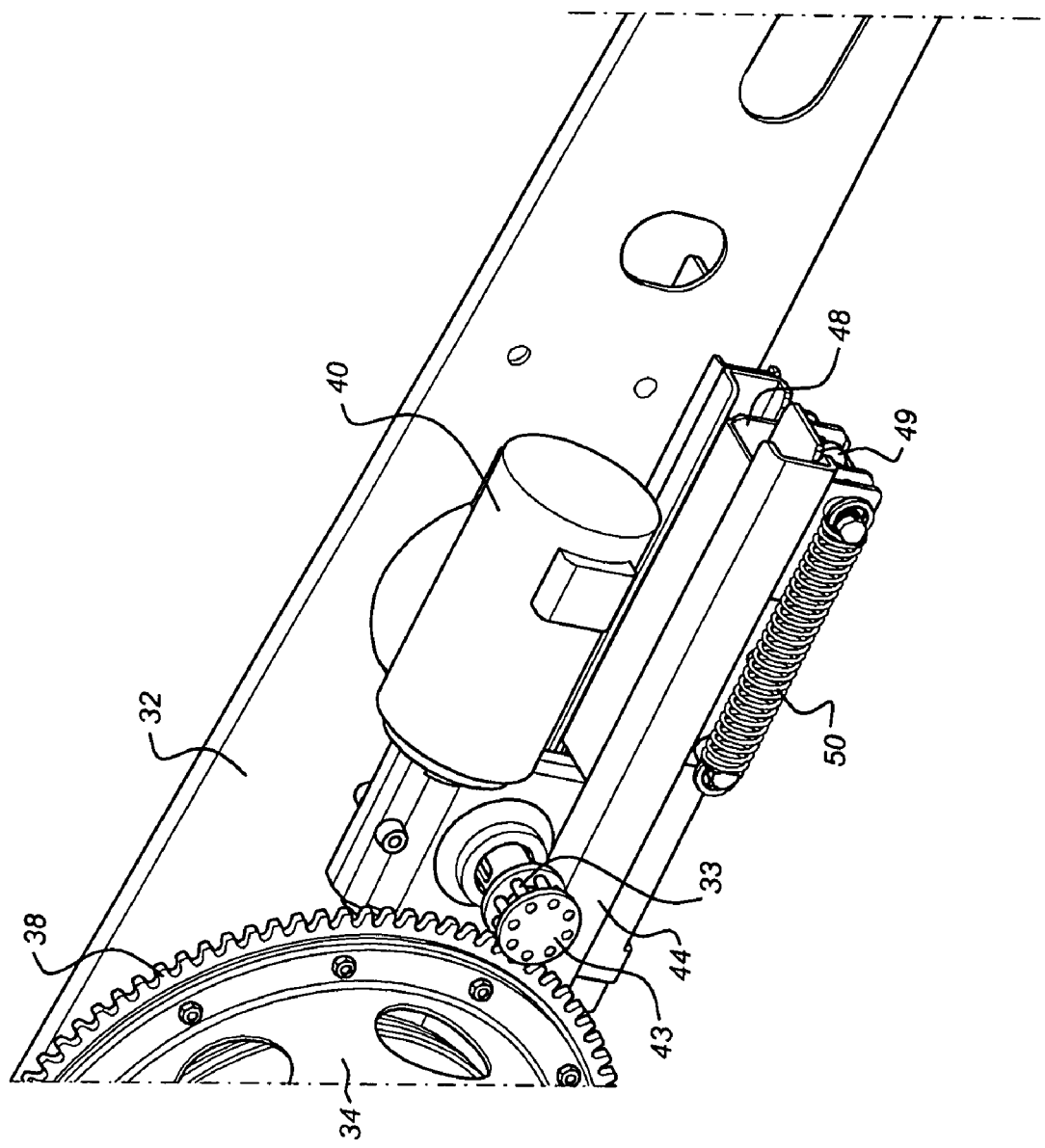
FIG. 7 shows the device according to FIG. 6 in a second active position.

In FIGS. 6 and 7 a further embodiment of the device according to the application is shown. The chassis of a caravan is indicated by 32 and a part of a drum 34 is shown being provided with a wheel ring 38 bolted thereto. A motor 40 is slidably arranged on a main slide 46, which can be moved in guide 44 in the direction of the wheel ring 38 in order to have sprocket 43 engage this wheel ring 38. It is noted that the sprocket 43 is made up from pins 33, so that ring gear 38 can be embodied as a ring gear for chains. Through the use of pins the tooth pressure can be lowered and sensitivity for foreign matter is decreased.

Displacement of the motor 40 over guide 44 is effected through actuator 41. The motor 40 is not directly connected to the other end of actuator 41 but an auxiliary slide 48 is provided, which is connected to end 49 of main slide 46 through springs 50.

Actuator 41 can be displaced over a considerable distance, being larger than the spacing between sprocket 43 and wheel ring 38 as shown in FIG. 6. However, as is clear from FIG. 7, as soon as the sprocket 43 engages the wheel ring 38 at continued movement of actuator 43, auxiliary slide 48 with motor 40 and sprocket 43 will not continue its movement but stay in the contacted position between the wheel ring 38 and sprocket 43. Because of that, the springs 50 will be tensioned (pull). If for example, the engagement between the sprocket 43 and wheel ring 38 is not perfect, Slight rotation of sprocket 43 and the tension in springs 50 will provide perfect engagement between sprocket 43 and wheel ring 38 as yet.

Through the use of a pull spring, which is tensioned and not compressed and the relative position of both the slide and the auxiliary slide, a very compact structure can be obtained, which is easily to mount below the floor of a caravan and does not impair the free height of such a vehicle. Furthermore, the length of the structure is very limited.

After reading the above description, the person skilled in the art will immediately think of variants which lie within the scope of the appended claims. Combination with all kinds of constructions that are known for independently moving a trailer are possible. Such obvious variants lie within the scope of the appended claims.

The invention claimed is:

1. A trailer, comprising:
    an auxiliary part for an auxiliary drive, comprising a drum part, which on one free end is provided with a ring gear fitted on its outer circumference, and on the other free end is provided with a bottom having at least three bolt holes lying equally spaced on a pitch circle, said drum being provided with cooling air apertures between the two free ends; and
    a drive unit provided with gear teeth interacting the ring gear of the auxiliary part, the drive unit configured for connection to the wheel/hub of said trailer;
    a chassis; and
    an axle,
    said axle being provided with a brake system comprising brake drums and wheels provided on said axle,
    wherein said auxiliary drive is fitted over said brake drum, the internal diameter of said auxiliary part being greater than the external diameter of said brake drum, the pitch circle of the at least three bolt holes corresponds to the pattern of the holes/bolts of said brake drum.

2. The trailer according to claim 1, wherein said drive unit can be moved in a direction substantially perpendicular to the direction of the axis of said wheel/drum.

3. The trailer according to claim 1, in which said drive unit can be moved substantially parallel to the direction of travel.

4. The trailer according to claim 3, wherein said drive unit can be moved linearly.

5. The trailer according to claim 4, comprising a single drive motor for achieving said linear movement and driving said gearwheel.

6. The trailer according to claim 1, wherein said drive motor is provided on a slide for linear displacement relative to said chassis.

7. The trailer according to claim 6, wherein said motor is provided on an auxiliary member being connected through a biasing member to said slide.

8. The trailer according to claim 7, wherein said biasing member comprises a tensioning spring (pull spring).

9. A trailer comprising a chassis, an axle and an auxiliary drive, said axle being provided with a drum having circumferential gear teeth and a wheel provided on said drum, said gear teeth extending outside the outer plane of the tyre of said wheel, and comprising a drive unit provided with a gearwheel, said drive unit being fitted so that it can move in order to engage with said gear teeth of said drum, wherein said drive unit can be moved in a direction substantially perpendicular to the direction of the axis of said wheel/drum.

10. The trailer according to claim 9, comprising a single drive motor for achieving linear movement and driving said gearwheel.

11. The trailer according to claim 9, wherein said drive motor is provided on a slide for linear displacement relative to said chassis.

12. The trailer according to claim 9, wherein said drum comprises a brake drum.

13. A trailer comprising a chassis, an axle and an auxiliary drive, said axle being provided with a drum having circumferential gear teeth and a wheel provided on said drum, said gear teeth extending outside the outer plane of the tyre of said wheel, and comprising a drive unit provided with a gearwheel, said drive unit being fitted so that it can move in order to engage with said gear teeth of said drum, in which said drive unit can be moved substantially parallel to the direction of travel.

14. The trailer according to claim 13, comprising a single drive motor for achieving linear movement and driving said gearwheel.

15. The trailer according to claim 13, wherein said drive motor is provided on a slide for linear displacement relative to said chassis.

16. The trailer according to claim 13, wherein said drum comprises a brake drum.

17. Auxiliary part (20) for an auxiliary drive for a trailer, comprising:
   a brake drum (19);
   a drum part (22) having a first free end, an opposite second free end, and a surface running from the first free end to the second free end, the drum part having bolt holes;
   bolts (25) in the brake drum, the drum part fitted over the drum, an internal diameter of said drum part being greater than an external diameter of said brake drum, the bolts passing through the bolt holes of the drum part, a pitch and a position of the bolt holes corresponding to a pitch and a position of the bolts;
   a ring gear (8) provided on an outer circumference of the first free end;
   a bottom (23) provided at the second free end;
   at least three bolt holes (24), lying equally spaced on a pitch circle, provided on the bottom;
   cooling air apertures (21) extending through the surface between the first and second free ends;
   a drive unit (9);
   gear teeth (13) provided on the drive unit; and
   the gear teeth interacting with the ring gear.

* * * * *